US012701496B2

(12) United States Patent
Glenn et al.

(10) Patent No.: US 12,701,496 B2
(45) Date of Patent: Aug. 4, 2026

(54) INTERMEDIATE TRANSITION OF NETWORK SERVICE USAGE LIMITS FOR NETWORK SUBSCRIBER DEVICES OF A WIRELESS TELECOMMUNICATION NETWORK

(71) Applicant: T-Mobile USA, Inc., Bellevue, WA (US)

(72) Inventors: Peter Jonathan Glenn, Bonney Lake, WA (US); Rohit Iyer, Renton, WA (US); Santosh Ashok Javali, Marysville, WA (US); Sean Harrison Roach, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 579 days.

(21) Appl. No.: 18/312,866

(22) Filed: May 5, 2023

(65) Prior Publication Data

US 2024/0373324 A1     Nov. 7, 2024

(51) Int. Cl.
*H04W 48/06* (2009.01)
*H04L 9/40* (2022.01)

(52) U.S. Cl.
CPC .......... *H04W 48/06* (2013.01); *H04L 63/029* (2013.01); *H04L 63/101* (2013.01)

(58) Field of Classification Search
None
See application file for complete search history.

(56) References Cited

U.S. PATENT DOCUMENTS

| 6,353,740 | B1 | 3/2002 | Granberg |
| 6,505,051 | B1 | 1/2003 | Alperovich et al. |
| 6,922,465 | B1 | 7/2005 | Howe |
| 6,990,330 | B2 | 1/2006 | Veerepalli et al. |
| 7,039,164 | B1 | 5/2006 | Howe |

(Continued)

FOREIGN PATENT DOCUMENTS

| CN | 107750440 B | 12/2021 |
| DE | 102007049025 B4 | 6/2020 |

(Continued)

*Primary Examiner* — Christopher M Crutchfield
(74) *Attorney, Agent, or Firm* — Perkins Coie LLP

(57) ABSTRACT

A wireless telecommunication network is configured to scale and transition usage limits of network services for subscriber devices connected thereto. For an intermediate time period following a subscriber failing to satisfy a service condition related to the network services, the wireless telecommunication network partially limits an Internet Protocol (IP) network connectivity service for subscriber devices associated with the subscriber using a firewall. In particular, the wireless telecommunication network configures the firewall to redirect Domain Name System (DNS) queries from the subscriber devices to whitelisted webpages of a quarantine IP domain. The whitelisted webpages are configured to enable users of the subscriber devices to resolve the subscriber's failure to satisfy the service condition. Following an expiration of the intermediate time period, the wireless telecommunication network can partially and/or fully limit usage of additional network services by the subscriber, thus balancing and allocating network service resources for other compliant subscriber devices.

20 Claims, 7 Drawing Sheets

(56) References Cited

U.S. PATENT DOCUMENTS

| | | |
|---|---|---|
| 7,107,039 B2 | 9/2006 | Liao et al. |
| 7,194,249 B2 | 3/2007 | Phillips et al. |
| 7,215,754 B1 | 5/2007 | Woodson et al. |
| 7,266,371 B1 | 9/2007 | Amin et al. |
| 7,333,810 B2 | 2/2008 | Preiss et al. |
| 7,483,698 B2 | 1/2009 | Hurtta |
| 7,657,253 B2 | 2/2010 | Lewis |
| 7,996,481 B2 | 8/2011 | Stillman et al. |
| 8,005,112 B2 | 8/2011 | Agmon et al. |
| 8,089,503 B2 | 1/2012 | Bruce et al. |
| 8,126,479 B2 | 2/2012 | Morrison |
| 8,126,480 B2 | 2/2012 | Morrison |
| 8,194,581 B1 | 6/2012 | Schroeder et al. |
| 8,234,676 B2 | 7/2012 | Klein et al. |
| 8,271,039 B2 | 9/2012 | Capuozzo et al. |
| 8,493,970 B2 | 7/2013 | Strieter et al. |
| 8,751,652 B2 | 6/2014 | Kuure et al. |
| 8,804,695 B2 | 8/2014 | Branam |
| 8,914,051 B2 | 12/2014 | Daly et al. |
| 9,398,491 B2 | 7/2016 | Schwarz |
| 9,769,730 B1 | 9/2017 | Hua et al. |
| 9,826,453 B2 | 11/2017 | Linkola et al. |
| 9,961,163 B2 | 5/2018 | Pastor Perales et al. |
| 10,091,658 B2 | 10/2018 | Zhang et al. |
| 10,666,750 B2 | 5/2020 | Nanavati et al. |
| 10,680,889 B2 | 6/2020 | Vasseur et al. |
| 10,715,996 B1 | 7/2020 | Singh et al. |
| 10,798,560 B2 | 10/2020 | Chennupati et al. |
| 10,798,645 B2 | 10/2020 | Gandhewar et al. |
| 11,089,469 B2 | 8/2021 | Bachmutsky et al. |
| 11,138,861 B2 | 10/2021 | Blatt et al. |
| 11,153,397 B2 | 10/2021 | Nanavati et al. |
| 11,197,260 B2 | 12/2021 | Balla et al. |
| 11,424,993 B1 | 8/2022 | Chaoji et al. |
| 12,184,509 B2 | 12/2024 | Shori et al. |
| 2001/0044840 A1 | 11/2001 | Carleton |
| 2003/0137976 A1 | 7/2003 | Zhu et al. |
| 2004/0208296 A1 | 10/2004 | Aboujaoude et al. |
| 2005/0143086 A1 | 6/2005 | Schwarz |
| 2006/0285691 A1 | 12/2006 | Chin et al. |
| 2007/0103317 A1 | 5/2007 | Zellner et al. |
| 2007/0118608 A1 | 5/2007 | Egli |
| 2007/0209054 A1 | 9/2007 | Cassanova |
| 2009/0228566 A1 | 9/2009 | Sharp et al. |
| 2012/0051235 A1 | 3/2012 | Kotecha et al. |
| 2012/0084152 A1 | 4/2012 | Highbaugh et al. |
| 2012/0123870 A1 | 5/2012 | Denman et al. |
| 2012/0203602 A1 | 8/2012 | Walters |
| 2012/0280813 A1 | 11/2012 | Ahluwalia et al. |
| 2012/0311045 A1 | 12/2012 | Sylvain |
| 2013/0347073 A1* | 12/2013 | Bryksa .................. H04L 63/083 726/4 |
| 2014/0187242 A1 | 7/2014 | Zhang |
| 2014/0366117 A1* | 12/2014 | Kumar .................... H04L 63/10 726/11 |
| 2015/0189044 A1 | 7/2015 | Pastor Perales et al. |
| 2016/0164926 A1 | 6/2016 | Zehavi et al. |
| 2016/0249213 A1* | 8/2016 | Wong .................... H04L 65/612 |
| 2016/0282132 A1 | 9/2016 | James et al. |
| 2018/0212837 A1 | 7/2018 | Kalluri et al. |
| 2020/0201735 A1 | 6/2020 | Livoti et al. |
| 2020/0322662 A1 | 10/2020 | Korte et al. |
| 2021/0337400 A1 | 10/2021 | Jat et al. |
| 2021/0384967 A1* | 12/2021 | Durvasula .......... H04W 84/045 |
| 2022/0070288 A1* | 3/2022 | Vakhovsky .......... H04M 1/575 |
| 2022/0303278 A1* | 9/2022 | Kirnapure .......... H04L 63/0236 |
| 2022/0312181 A1* | 9/2022 | Sumien ................. H04W 76/12 |
| 2022/0377582 A1 | 11/2022 | Sakamoto et al. |
| 2022/0417768 A1 | 12/2022 | Yao et al. |
| 2023/0418279 A1 | 12/2023 | Zhu et al. |
| 2024/0373324 A1 | 11/2024 | Glenn et al. |

FOREIGN PATENT DOCUMENTS

| | | |
|---|---|---|
| EP | 1117221 A2 | 7/2001 |
| EP | 1345456 A2 | 9/2003 |
| EP | 1226725 B1 | 10/2004 |
| EP | 1867136 A2 | 12/2007 |
| EP | 1894403 A1 | 3/2008 |
| EP | 2150067 B1 | 6/2013 |
| EP | 2625626 A2 | 8/2013 |
| EP | 2478665 B1 | 11/2014 |
| EP | 2864908 A2 | 4/2015 |
| EP | 2854343 B1 | 10/2015 |
| EP | 3780682 A1 | 2/2021 |
| EP | 3697064 B1 | 9/2022 |
| JP | 2000215143 A | 8/2000 |
| KR | 100376584 B1 | 3/2003 |
| WO | 2004071012 A1 | 8/2004 |
| WO | 2010126465 A1 | 11/2010 |
| WO | 2014106073 A1 | 7/2014 |
| WO | 2014129936 A1 | 8/2014 |
| WO | 2015030897 A1 | 3/2015 |
| WO | 2015078485 A1 | 6/2015 |
| WO | 2015103296 A1 | 7/2015 |
| WO | 2018022360 A1 | 2/2018 |
| WO | 2018182223 A1 | 10/2018 |
| WO | 2019016389 A1 | 1/2019 |
| WO | 2020086409 A1 | 4/2020 |
| WO | 2024097129 A1 | 5/2024 |

* cited by examiner

500

602

Classify subscriber status based on subscriber failing to satisfy service requirement for network services

604

Configure an intermediate firewall that redirects webpage requests from subscriber device to a suspension web-service that provides whitelisted webpages

606

After a time period, limit usage by the subscriber to each of the network services

700

INTERMEDIATE TRANSITION OF NETWORK SERVICE USAGE LIMITS FOR NETWORK SUBSCRIBER DEVICES OF A WIRELESS TELECOMMUNICATION NETWORK

BACKGROUND

Wireless telecommunication networks provide communication services for end users at user devices that are subscribed to the networks. The user devices subscribed to a wireless telecommunication network are also referred herein as subscriber devices. These communication services provided by a wireless telecommunication network include connectivity to data networks (e.g., the Internet, an Internet Protocol (IP) network), telephone calling services, text messaging services, and more. Efficient operation of a wireless telecommunication network requires management of access to and usage of these communication services by subscriber devices.

BRIEF DESCRIPTION OF THE DRAWINGS

Detailed descriptions of implementations of the present invention will be described and explained through the use of the accompanying drawings.

Figure 1:
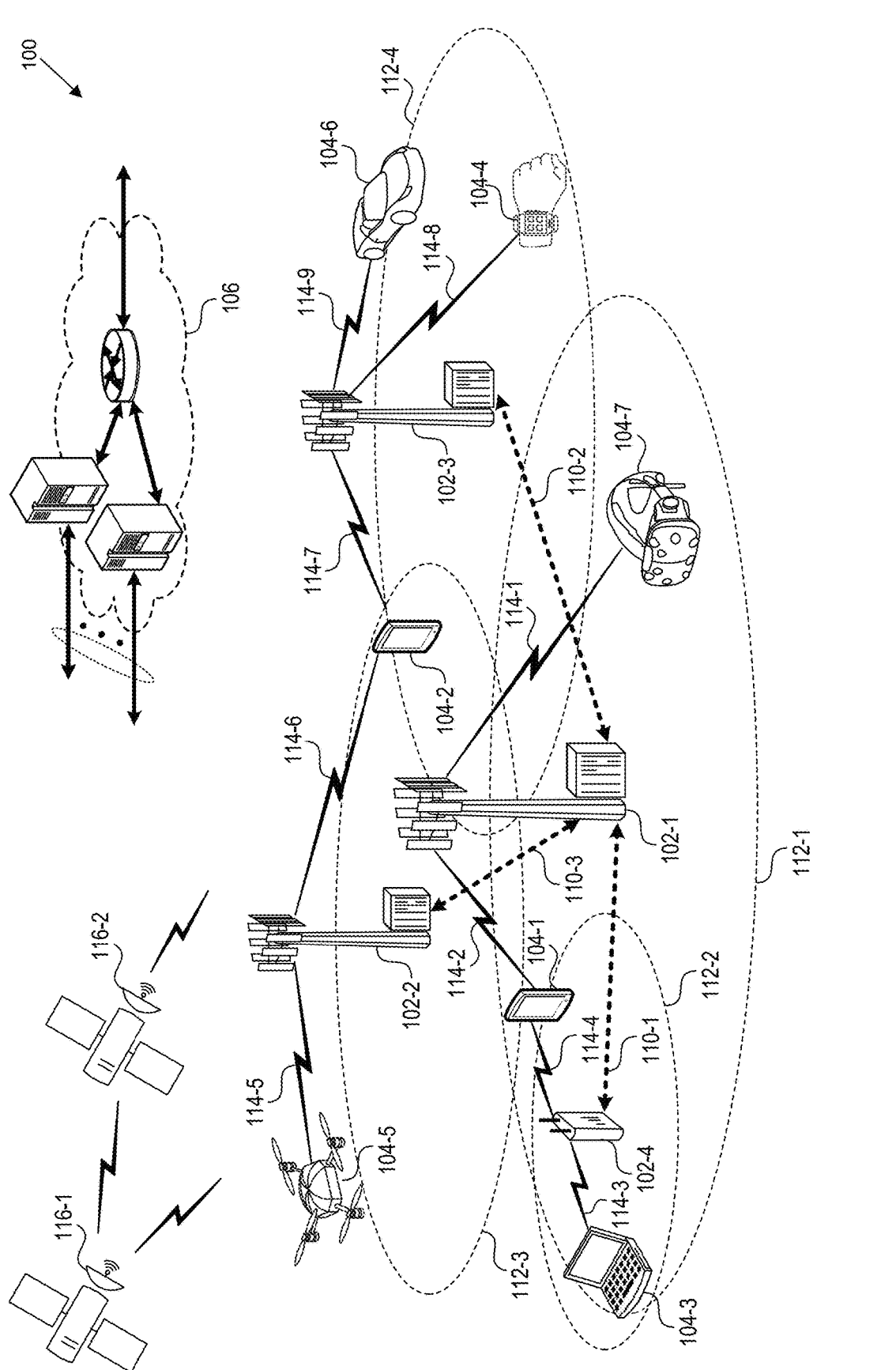
FIG. 1 is a block diagram that illustrates a wireless telecommunication network that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Existing techniques for subscriber service management in wireless telecommunication networks involve an immediate implementation of severe and dramatic restrictions on network service access. According to some existing techniques, a wireless telecommunication network immediately responds to a failure by a subscriber to meet service conditions/requirements by completely or at least significantly cutting off network services provided to the subscriber. In some instances, the failure to meet service conditions/requirements was unintentional or unforeseen, and the subscriber is significantly impaired in resolving the service condition failure because of the complete service cut-off. The disclosed technology provides useful techniques for escalating the restriction of access/usage of network services and enabling the subscriber to quickly resolve the service condition/requirement failure during the escalation. For example, during an intermediate time period preceding complete service cut-off, mobile broadband services are limited via a firewall that redirects subscribers to resources by which the subscribers can prevent the complete service cut-off.

The disclosed technology provides improved techniques for scaling and transitioning usage limits of network services for subscriber devices of a wireless telecommunication network. In particular, example implementations include partially limiting an Internet Protocol (IP) network connectivity service provided by the wireless telecommunication network based on configuring a firewall that redirects webpage requests to specific and/or pre-configured whitelisted webpages, in response to a subscriber failing to satisfy network service conditions (e.g., failure by a network subscriber to pay a service bill, incompatibility between device firmware or software with network services, a subscriber device being located in an region or jurisdiction unsupported or uncovered by the wireless telecommunication network), and/or the like. The partial limiting of the IP network connectivity service can occur during an intermediate time period between the subscriber failing to satisfy the network service conditions and a subsequent time period in which the IP network connectivity service is further limited and/or in which usage of additional network services (e.g., telephonic calling services, messaging services) are also limited. For example, following an expiration of the intermediate time period, the wireless telecommunication network can be configured to partially and/or fully limit usage of additional network services by the subscriber, thus balancing and allocating network service resources for other subscriber devices that satisfy the service condition.

Therefore, disclosed techniques and implementations improve subscriber device management and network service usage balancing/limiting. With partial limitation of IP network connectivity services during an intermediate time period, subscribers are effectively alerted in a tangible manner when failing to satisfy network service requirements or conditions, thus increasing a likelihood that such failures are quickly and efficiently resolved. Further, the whitelisted webpages provided during the partial limitation of IP network connectivity services include features via which subscriber device users can trigger or initiate network-side processes to resolve said failures to meet service conditions. Thus, the partial limitation itself with the whitelisted webpages improves an efficiency related to the resolution of network service conditions and can lighten load on the wireless telecommunication network otherwise occupied by network users to manually and iteratively resolve the network service conditions.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Wireless Communications Systems

FIG. 1 is a block diagram that illustrates a wireless telecommunication network 100 in which aspects of the disclosed technology are incorporated. The wireless telecommunication network 100 provides network services, such as an IP network connectivity service (also referred to as cellular data, mobile data, mobile broadband, and the like), telephone or calling services, messaging services (e.g., Short Message/Messaging Service (SMS)), and others to subscriber devices connected to the wireless telecommunication network 100. According to the present disclosure, usage of these network services can be partially and/or fully limited and balanced based on subscriber status with respect to network service requirements or conditions. Further, limiting of network services can be dynamically escalated in different time periods, thus decreasing a likelihood that full limitation and repeated limitations on service usage are eventually reached.

The wireless telecommunication network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The wireless telecommunication network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of the wireless telecommunication network 100 also include wireless devices 104-1 through 104-7 (referred to individually as "wireless device 104" or collectively as "wireless devices 104" and also referred to herein as user equipment or UE) and a core network 106. The wireless devices 104-1 through 104-7 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

Wireless devices 104 can include subscriber devices. Subscriber devices include devices that are associated with subscriber entities (e.g., a person, a group of persons, a defined organization or entity) who subscribe to the wireless telecommunication network (and/or with a network operator associated with the wireless telecommunication network) to receive network services via the wireless telecommunication network. In some examples, the network services are provided to a subscriber entity via the wireless telecommunication network based on service conditions (also referred to as service requirements, subscription conditions, service agreements, and the like). Such conditions can include the subscriber entity using specific devices (e.g., devices manufactured by the network operator, devices pre-configured by the network operator) to receive the network services, the subscriber devices being configured with specific software or applications, the subscriber entity paying a subscription/service fee or bill, the subscriber devices being located in a certain region or jurisdiction, and/or the like. Different subscriber entities belonging to the wireless telecommunication network 100 can be associated with different subscription requirements, and the wireless telecommunication network 100 can store subscriber data that describes the different subscription requirements for different subscriber entities. According to example implementations, the wireless telecommunication network 100 is configured to monitor the subscription requirements for subscriber entities and detect when subscribers fail to satisfy the subscription requirements. For example, the wireless telecommunication network 100 is configured to detect or determine that a subscriber fails to pay a subscription bill. Based on the determination, the wireless telecommunication network 100 is configured to transition subscriber devices through partial and/or full limits on network service usages.

Wireless devices 104 of the wireless telecommunication network 100 vary in type and capability. For example, the wireless devices 104 illustrated in FIG. 1 includes a head-mounted device (HMD) that is configured to execute XR services (104-7), a smart watch device (104-4), a mobile phone (104-1), and others. The wireless devices 104 each execute different services or applications and according to aspects of the disclosed technology, handover of the wireless devices 104 within the wireless telecommunication network 100 is specific to each wireless device 104 and the services or applications presently being executed at each wireless device 104.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The wireless telecommunication network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The wireless telecommunication network 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The wireless telecommunication network 100 can thus form a heterogeneous network in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the wireless telecommunication network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunication network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network equipment at the edge of the wireless telecommunication network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in wireless telecommunication network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links. In handover operations, communication links 114 can be created, redirected or modified, and/or terminated in order to provide UE mobility within the wireless telecommunication network 100.

In some implementations of the wireless telecommunication network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the wireless telecommunication network 100 implements 6G technologies including increased densification or diversification of network nodes. The wireless telecommunication network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the wireless telecommunication network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the wireless telecommunication network 100 can implement a converged Radio Access Network (RAN) and Core architecture to achieve Control and User Plane Separation (CUPS) and achieve extremely low User Plane latency. In yet another example of 6G, the wireless telecommunication network 100 can implement a converged Wi-Fi and Core architecture to increase and improve indoor coverage.

Example Telecommunication Network Functions

Figure 2:
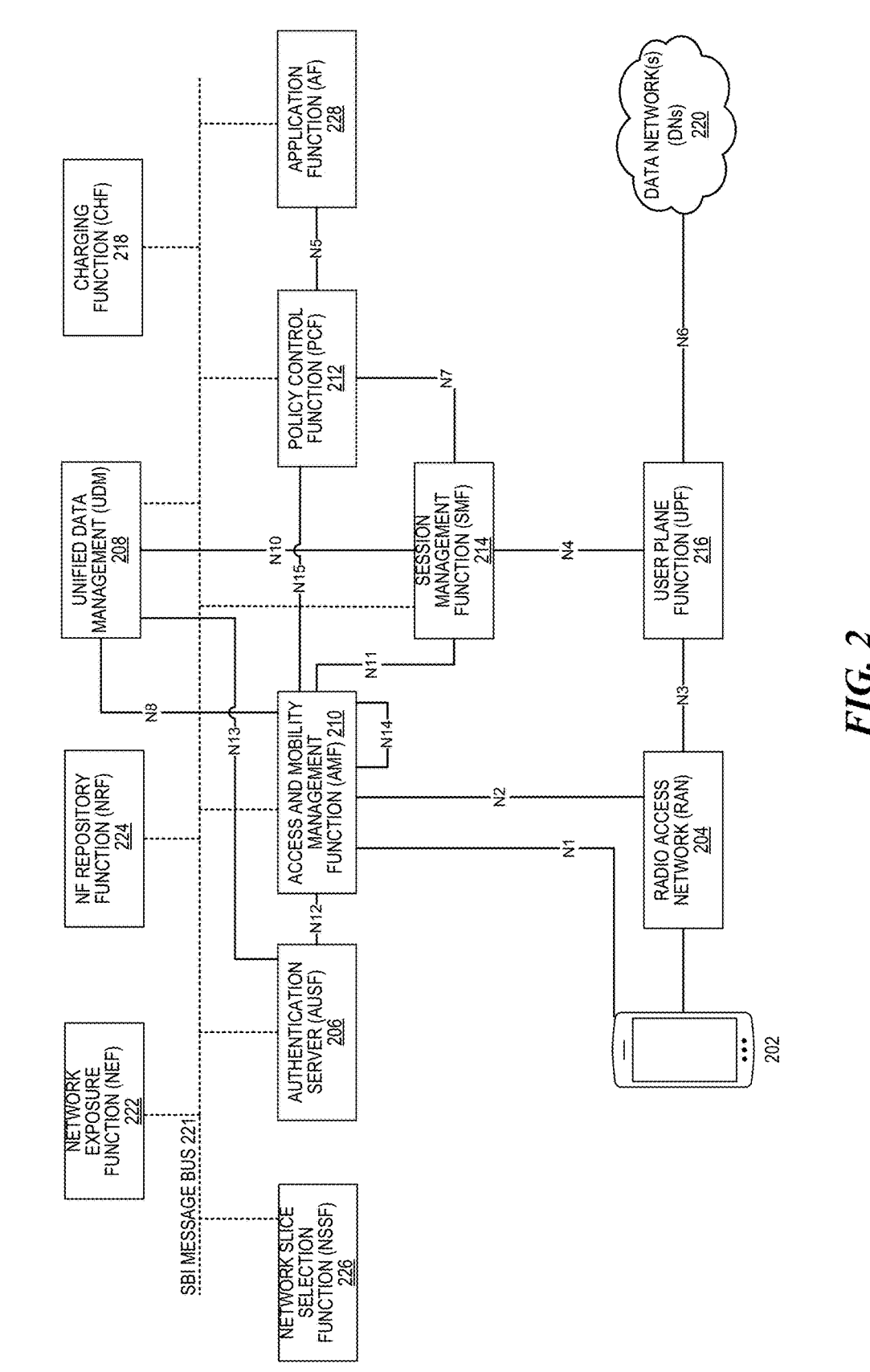
FIG. 2 is a block diagram that illustrates network functions (NFs) of a wireless telecommunication network that can implement aspects of the present technology.

FIG. 2 is a block diagram that illustrates an architecture 200 including network functions (NFs) that are related to aspects of the present technology. For example, the network functions in the illustrated example belong to a 5G core network. It will be appreciated that the disclosed technology is also applicable to network functions associated with a 4G LTE core network (e.g., Evolved Packet Core, or EPC), a 6G core network, and/or the like.

According to FIG. 2, a wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218. In some implementations, one or more NFs of the core network perform example operations described herein to detect network-supported services being executed by a UE, provide event thresholds that correspond to network-supported services to UEs, and facilitate handover of UEs between network cells and/or nodes.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context. In some implementations, the UDM 208 is used to generate service suspension policies for subscribers that have failed to satisfy service conditions, with the service suspension policies implementing intermediate suspensions, escalated and/or full suspensions, partial service limits, full service limits, and the like disclosed herein.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. For example, the PCF 212 enforces interim/intermediate service suspensions on subscriber devices, escalated and/or full service suspensions, partial service usage limits, full service limits, and/or the like. In some implementations, the PCF 212 implements a firewall that is configured to limit network service usage for specified subscribers. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Example Implementations of Intermediate Network Service Transitions

The present disclosure provides intermediate transitions and time periods in which network service usage for a subscriber is partially and/or fully limited. In particular, example implementations include an intermediate time period during which an IP network connectivity service is limited following a failure by a subscriber to satisfy network service conditions. Example implementations disclosed herein can result in a faster and more efficient resolution of these failures and can provide an automated management of network service usage across a population of network subscribers. Example implementations also enable a wireless telecommunication network to re-allocate and balance network resources for subscriber devices of subscribers that satisfy service conditions.

Figure 3:
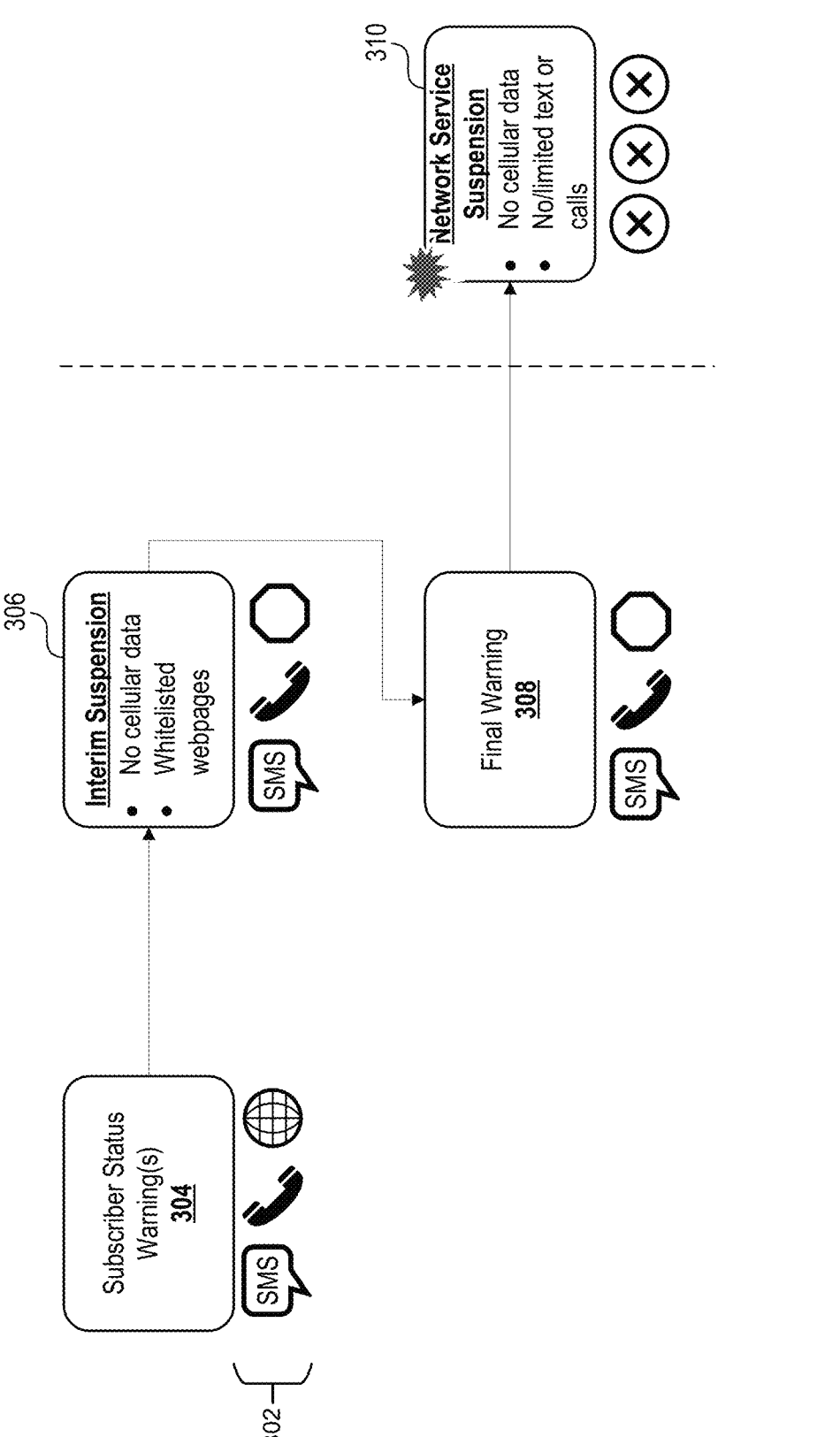
FIG. 3 is a block diagram that illustrates transitions between multiple network service usage limits or suspension states.

FIG. 3 is a block diagram that illustrates transitions between multiple network service usage limits or suspension states during multiple time period. According to the illustrated example, a wireless telecommunication network implements an interim or intermediate step or time window where IP network connectivity services (e.g., cellular data, mobile broadband) is impacted for noncompliant subscribers.

A wireless telecommunication network provides multiple network services 302 (including messaging services, calling services, and IP network connectivity services) which are associated with service conditions to which subscribers are required to comply. These service conditions can include service bills or payments, location restrictions, subscriber device compatibility, cybersecurity threat level of subscriber devices, and/or others. In FIG. 3, a wireless telecommunication network is configured to provide subscriber status warnings 304 to a subscriber (e.g., via associated subscriber devices) in response to a subscriber failing to satisfy a service condition. During the warning, the network services 302 have not been limited, and can remain non-limited for the subscriber for a first time period. Additionally, or alternatively, the wireless telecommunication network provides the subscriber status warnings 304 if the wireless telecommunication network predicts that the subscriber will soon fail to satisfy the service condition.

The wireless telecommunication network then triggers an interim service suspension 306 following the subscriber failing to satisfy the service condition. The initiation of the interim service suspension 306 defines a beginning on an intermediate time period in which IP network connectivity services are limited while other network services are non-limited. As discussed, this interim service suspension 306 provides a tangible and consequential alert to the subscriber regarding the failure to satisfy service conditions and increases a likelihood of resolving said failure and preempting and obviating a more comprehensive service suspension (and the resulting expenditure of network resources to reconfigure subscriber device access).

The interim service suspension 306 is implemented based on a firewall and a suspension webservice implemented by the wireless telecommunication network. In particular, the firewall is configured to redirect IP network connection requests from subscriber devices to the suspension webservice, which serves whitelisted webpages to the subscriber devices in place of the requested webpages. The whitelisted webpages are configured to indicate the subscriber's failure to satisfy the service condition and can include subscriber-specific and contextual information related to the service condition. The whitelisted webpages also include interactable features via which the users of the subscriber devices can initiate and/or perform processes that resolve the failure the satisfy the service condition. In this way, this automatic serving of whitelisted webpages facilitates a quick and efficient resolution of service condition failures that thresholds continued usage of network services by the subscriber.

In some implementations, the wireless telecommunication network can provide a final warning 308 prior to a following service suspension. In some examples, the whitelisted webpages provided during the interim service suspension embody the final warning 308 provided to subscriber devices. In some implementations, the wireless telecommunication network provides the final warning 308 to an increased number of subscriber devices associated with the subscriber relative to the subscriber status warnings 304. Different subscriber devices can be associated with different permission levels and/or notification preferences, according to which the subscriber status warning(s) 304 and the final warning 308 can be distributed. For example, the subscriber status warning(s) 304 can first be provided at a subscriber device with a high permission level for managing subscriber information (e.g., use of subscriber payment methods), and the final warning 308 can be provided at every subscriber device regardless of permission level, including devices associated with a low permission level (e.g., prohibited use of subscriber payment methods).

As shown in FIG. 3, the wireless telecommunication network triggers an escalated network service suspension 310. The escalated network service suspension 310 is more restrictive than the interim service suspension 306. For example, the escalated network service suspension 310 involves a full usage limit on IP network connectivity services, in which webpage requests from subscriber devices are refused or blocked and are no longer redirected to whitelisted webpages. In the illustrated example, the escalated network service suspension 310 also places limits on other network service such as calling or messaging.

In particular, the wireless telecommunication network triggers the escalated network service suspension 310 following an expiration of the intermediate time period for the interim service suspension 306. With the escalated network service suspension 310, the wireless telecommunication network is able to reallocate and balance network resources to provide network services to other subscriber devices for subscribers that satisfy the service conditions.

Figure 4:
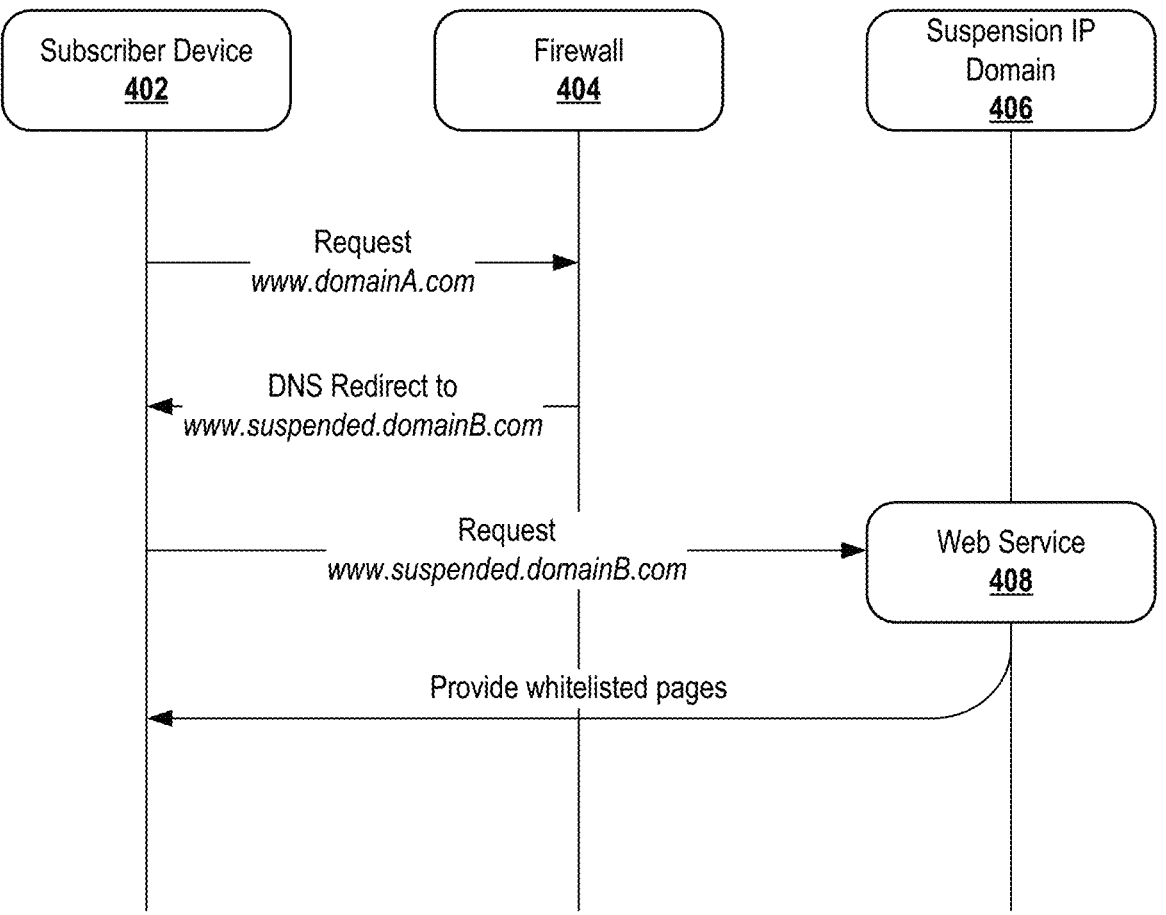
FIG. 4 illustrates a sequence diagram that illustrates a network firewall that is configured to limit usage of an IP network connectivity service provided by a wireless telecommunication network.

FIG. 4 illustrates a sequence diagram that illustrates an example implementation for limiting usage of an IP network connectivity service provided by a wireless telecommunication network. The example implementation shown in FIG. 4 can embody or implement an intermediate service suspension (e.g., interim service suspension 306 in FIG. 3) in which the IP network connectivity service is at least partially limited.

In FIG. 4, a subscriber device 402 associated with a subscriber that has failed to satisfy service conditions transmits a webpage request for a given IP domain in an IP network (e.g., the Internet). In some examples, the webpage request includes a Domain Name System (DNS) query that specifies the given IP domain and is addressed to DNS nameservers associated with the IP network. For example, the webpage request specifies www.domainA.com or www.google.com or another Uniform Resource Locator (URL) for a domain, sub-domain, sub-sub-domain, or the like. In particular, the subscriber device 402 transmits the webpage request via the wireless telecommunication network to which the subscriber is subscribed (and to which the subscriber device 402 is connected).

In some implementations, subscriber devices 402 for the wireless telecommunication network are pre-configured and provided to subscribers by a network operator or network provider. The subscriber devices 402 can be pre-configured to restrict user access to DNS nameserver information stored on the subscriber devices 402. Therefore, the subscriber devices 402 are pre-configured with user access restrictions so that device users are not able to manipulate operating system (OS) level configuration information (e.g., dynamic host configuration protocol (DHCP) information) to override or avoid firewalls or systems that implement the present technology.

A firewall 404 of the wireless telecommunication network receives the webpage request from the subscriber device 402, and the firewall 404 has been configured to limit IP network access for the subscriber based on the subscriber failing to satisfy the service conditions. Thus, the firewall 404 redirects the webpage request to a suspension IP domain 406 or a quarantine IP domain. The suspension IP domain 406 can be associated with a network operator or a subscriber management entity associated with the wireless telecommunication network. For example, the webpage request is redirected to www.suspended.domainB.com or www.suspended.t-mobile.com.

The firewall 404 specifically redirects the webpage request to a web service 408 hosted within the suspension IP domain 406. The web service 408 is configured to provide or serve whitelisted webpages to the subscriber device 402 in response to the webpage request and any other requests redirected by the firewall 404. In some implementations, the web service 408 itself is a webpage, a static page, a service provided by a web server associated with a network operator or provider of the wireless telecommunication network, and/or the like.

The firewall 404 can be implemented within the wireless telecommunication network and is configured to limit IP network connectivity service as specifically provided by the wireless telecommunication network to the subscriber. Accordingly, the subscriber (or its subscriber devices) can access and retrieve specified webpages when requested via a different network, such as a local area network (LAN), a wireless local area network (WLAN), a Wi-Fi network, another wireless telecommunication network, or the like.

In some implementations, the firewall 404 can be reconfigured to allow the webpage requests from the subscriber device 402. For example, during an intermediate time window in which the firewall 404 is configured to during the predetermined length of time, the wireless telecommunication network determines that the subscriber has satisfied the service condition. Accordingly, the wireless telecommunication network reconfigures the firewall 404 to allow the webpage requests from the subscriber device 402. In some examples, the wireless telecommunication network can also respond to previously redirected webpage requests. For example, after the subscriber has satisfied the service condition, the wireless telecommunication network can serve www.domainA.com or other specified webpage to the subscriber device 402. In some implementations, the wireless telecommunication network serves the specified webpage of a previously redirected webpage request if the subscriber satisfies the service condition via a whitelisted webpage provided by the web service 408.

Figure 5:
FIG. 5 illustrates a view of an example whitelisted webpage that indicates a limited usage of network services provided by a wireless telecommunication network, including an IP network connectivity service.

FIG. 5 illustrates a view of an example of a whitelisted webpage 500 that indicates a limited usage of network services provided by a wireless telecommunication network. For example, the whitelisted webpage 500 is provided by a suspension webservice in response to webpage requests or queries received by the wireless telecommunication network from a particular subscriber device. As shown in the illustrated example, the whitelisted webpage 500 includes subscriber-specific information related to the service condition, and the suspension webservice can be configured to retrieve subscriber-specific information when generating the whitelisted webpage 500. For example, the subscriber-specific information includes a timepoint or deadline for a subsequent time period in which service usage limits are transitioned to an escalated state (e.g., fully limiting IP network connectivity service, additionally limiting other network services). In some implementations, the whitelisted webpage 500 is dynamically generated in response to a subscriber status of a subscriber being classified based on a failure to satisfy a service condition.

According to example implementations, the whitelisted webpage 500 and other whitelisted webpages are provided to a particular subscriber device in order to enable and increase a likelihood that the subscriber quickly and easily corrects the failure to satisfy a service requirement. The whitelisted webpage 500 is configured to enable a user of the subscriber device to initiate a network-side process that results in the subscriber satisfying the service requirement. In an example in which the unmet service condition relates to a service bill or payment, the whitelisted webpage 500 includes a Pay Now interactable resource or feature which triggers a payment process performed by a subscriber-management subsystem associated with the wireless telecommunication network. The whitelisted webpage 500 is also configured to enable a user of the subscriber device to redefine the service requirement or condition that the subscriber fails to satisfy. In the illustrated example, the whitelisted webpage 500 includes a Payment Arrangement interactable resource or feature via which the service condition (e.g., a bill payment) can be re-defined with respect to amount, timeline or deadlines, frequency, and/or the like.

Example Operations for Intermediate Network Service Transitioning

Figure 6:
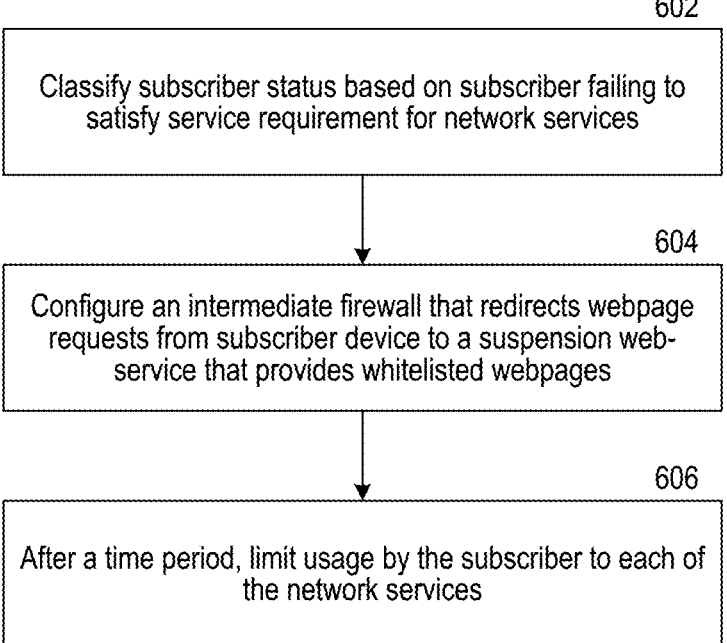
FIG. 6 is a flow diagram that illustrates example operations for intermediate transitioning of network service usage, including partially and/or fully limiting usage of an IP network connectivity service provided by a wireless telecommunication network.

FIG. 6 illustrates a flow diagram that includes example operations for intermediate transitioning of network service usage, including partially and/or fully limiting usage of an IP network connectivity service provided by a wireless telecommunication network. In some implementations, the example operations are performed by a subscriber-management system. The subscriber management system can be a subsystem of the wireless telecommunication network, a system in communication with the wireless telecommunication network, a functional system distributed across multiple systems or servers of the wireless telecommunication network, and/or the like.

At 602, the subscriber-management system classifies a subscriber status of a network subscriber of the wireless telecommunication network based on the network subscriber failing to satisfy a service requirement for network services. For example, the subscriber-management system determines that the network subscriber has failed to pay a service bill or payment and accordingly classifies the subscriber as a noncompliant state. The network services can include at least an Internet Protocol (IP) network connectivity service and one or more telecommunication services (e.g., calling service, messaging service, cloud storage service).

At 604, the subscriber-management system configures an intermediate firewall that partially limits an IP network connectivity service provided by the wireless telecommunication network to subscriber devices of the network subscriber. In particular, the subscriber-management system configures the intermediate firewall to redirect webpage requests (e.g., DNS queries or requests) from the subscriber devices to a suspension web-service. The suspension web-service is in a different IP domain than an IP domain specified in the webpage request and is configured to provide whitelisted webpages. The whitelisted webpages can be dynamically generated and customized for the network subscriber to convey subscriber-specific information and to enable the network subscriber to satisfy the service requirement, for example, via network-side processes (e.g., a bill payment process).

According to example implementations, the intermediate firewall is configured to partially limit the IP network connectivity service for an intermediate time period following the subscriber status being classified. In some implementations, the IP network connectivity service is the only network service that is limited during the intermediate time period; for example, the one or more telecommunication services are not limited during the intermediate time period. For example, while webpage requests and IP network access requests are redirected during the intermediate time period, mobile-terminated calls and mobile-originated calls to and from (respectively) the subscriber device(s) of the network subscriber remain allowed.

In some implementations, the intermediate firewall is configured using subscriber information that maps the subscriber status of the network subscriber to subscriber devices that are associated with the network subscriber. The subscriber devices can be devices owned and operated by users that are related to the network subscriber. The subscriber information can include mappings between a subscriber identifier (e.g., an account number, a customer identifier) and one or more mobile station international subscriber directory numbers (MSISDNs) that each correspond to a subscriber device. With the subscriber information, the intermediate firewall can identify that a device from which a webpage request is received is a subscriber device associated with the network subscriber. In some implementations, the intermediate firewall is configured to limit the IP network connectivity service for each subscriber device associated with the subscriber.

At 606, the subscriber-management system limits usage by the subscriber to each of the network services provided by the wireless telecommunication network after an intermediate time period if the subscriber remains in the subscriber status (e.g., the subscriber still fails to satisfy the service requirement). In some implementations, the subscriber-management system fully limits the IP network connectivity service and/or additionally limits other network services in a subsequent time period that follows the intermediate time period. For example, in contrast to redirecting webpage requests to whitelisted webpages, the subscriber-management system refuses the webpages requests received after the intermediate time period. The length of the intermediate time period can be configurable based on subscriber-specific information, including a degree or magnitude that the subscriber fails to satisfy a service condition (e.g., an amount of a past due bill), the subscriber's history of satisfying (or not) service conditions, a number of subscriber devices associated with the subscriber, and/or the like.

Limiting usage of network services after the intermediate time period can include allowing mobile-terminated (MT) calls to the subscriber device(s) via the wireless telecommunication network while blocking mobile-originated (MO) calls from the subscriber device via the wireless telecommunication network. This can be a partial limit on a telephone calling service provided by the wireless telecommunication network. In another example, the subscriber-management system causes mobile-originated calls from the subscriber device(s) to be redirected to a support platform associated with the wireless telecommunication network. The support platform can provide a communication channel between users of the subscriber devices and customer support users that can assist the subscriber to satisfy the service condition. The communication channel provided by the support platform can also be a text-based messaging modality; for example, a mobile-originated call is blocked, and the support platform can cause a text messaging user application on the subscriber device to automatically open. In some examples, the support platform is configured to provide information to users of subscriber devices to explain and describe affected network service limits, in response to inquiries by subscriber device users such as why is my mobile broadband not working, has my service payment been received, how long until mobile broadband is restored if I resolve the service condition (e.g., service payment) now, and the like.

Limiting usage of network services after the intermediate time period can also include blocking both mobile-terminated calls and mobile-originated calls for the subscriber device(s). In some implementations, multiple time periods in which network services are limited to different degrees can follow the intermediate time period. For example, in a first subsequent time period, MT calls are allowed while MO calls are redirected to the support platform; in a second subsequent time period, MO calls are blocked; and in a third subsequent time period, both MT calls and MO calls are blocked.

Example Computer Systems

Figure 7:
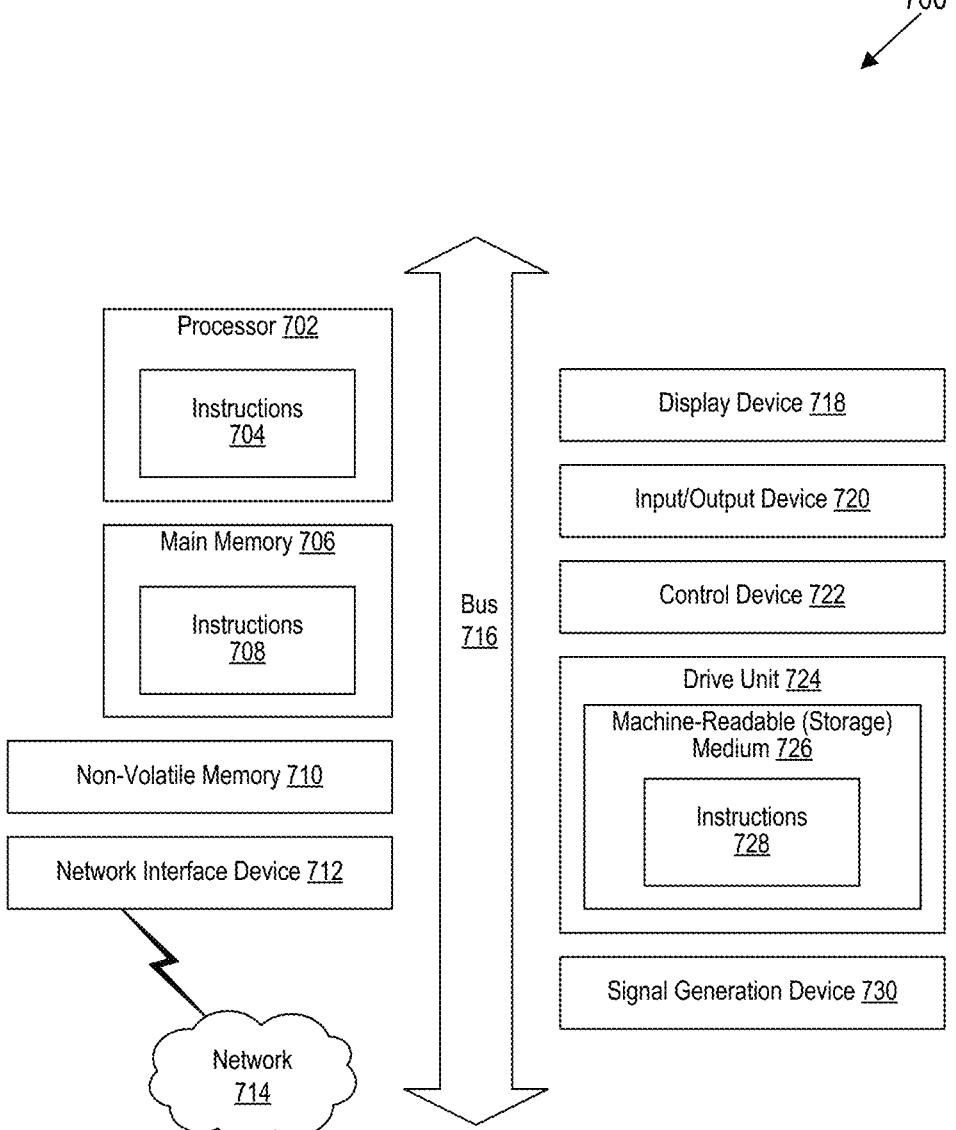
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the disclosed technology. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the present disclosure, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the present disclosure should not be taken to imply that the terminology is being redefined herein to be restricted to any specific characteristics, features, or aspects of the present disclosure with which that terminology is associated. In general, the terms used in the following claims should not be construed to limit the present disclosure to the specific examples disclosed herein, unless the above Detailed Description explicitly defines such terms. Accordingly, the actual scope of the present disclosure encompasses not only the disclosed examples, but also all equivalent ways of practicing or implementing the disclosed technology under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the disclosed technology can be modified to employ the systems, functions, and concepts of the various references described above to provide yet further implementations of the disclosed technology.

To reduce the number of claims, certain implementations are presented below in certain claim forms, but the applicant contemplates various aspects of the disclosed technology in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. At least one non-transitory computer-readable storage medium storing instructions that, when executed by at least one data processor of a system, cause the system to:
    classify a subscription status of a subscriber associated with a wireless telecommunication network based on the subscriber failing to satisfy a subscription requirement related to network services provided by a network provider of the wireless telecommunication network,
        wherein the network services provided by the network provider include at least an Internet Protocol (IP) network connectivity service and one or more telecommunication services;
    receive, via the wireless telecommunication network from a subscriber device associated with the subscriber, a Domain Name System (DNS) request that identifies a particular IP domain of an IP network;
    redirect, according to the subscription status of the subscriber, the DNS request to a suspension web-service belonging to a second IP domain different than the particular IP domain,
        wherein the suspension web-service is configured to provide a set of whitelisted webpages within the second IP domain to the subscriber device;
        wherein each of the set of whitelisted webpages includes at least one of: an indication of the subscription status and the subscription requirement, or an interactable resource that triggers a process for changing the subscription status of the subscriber; and
    in response to determining that the subscriber continues to fail to satisfy the subscription requirement after a predetermined length of time, configure the wireless telecommunication network to (i) refuse to resolve a second DNS request received from the subscriber device, and (ii) limit usage by the subscriber of at least one additional service of the network services provided by the network provider,
        wherein limiting usage by the subscriber of at least one additional service comprises allowing mobile-terminated calls to the subscriber device via the wireless telecommunication network while restricting mobile-originated calls from the subscriber device via the wireless telecommunication network.

2. The at least one non-transitory computer-readable storage medium of claim 1, wherein restricting the mobile-originated calls from the subscriber device comprises blocking the mobile-originated calls from the subscriber device via the wireless telecommunication network.

3. The at least one non-transitory computer-readable storage medium of claim 1, wherein restricting the mobile-originated calls from the subscriber device comprises redirecting the mobile-originated calls from the subscriber device of the subscriber via the wireless telecommunication network to a support platform associated with the network provider.

4. The at least one non-transitory computer-readable storage medium of claim 1, wherein at least one whitelist webpage includes a second interactable resource that enables a user of the subscriber device to redefine the subscription requirement that the subscriber fails to satisfy.

5. The at least one non-transitory computer-readable storage medium of claim 1, wherein the instructions further cause the system to:
    during the predetermined length of time, determine that the subscriber satisfies the subscription requirement; and
    allow the wireless telecommunication network to respond to the DNS request according to the particular IP domain of the IP network.

6. The at least one non-transitory computer-readable storage medium of claim 1, wherein the instructions further cause the system to:
    determine that the subscriber device is associated with the subscriber according to a mobile station international subscriber directory number (MSISDN) associated with the subscriber device.

7. A method comprising:
    classifying, by a subscriber-management subsystem of a wireless telecommunication network, a subscriber status of a subscriber associated with the wireless telecommunication network based on the subscriber failing to satisfy a service requirement related to network services provided by a network provider of the wireless telecommunication network,
        wherein the network services provided by the network provider include at least an Internet Protocol (IP) network connectivity service and one or more telecommunication services;
    configuring, by the subscriber-management subsystem, an intermediate firewall to partially limit usage by the subscriber of the IP network connectivity service for a first time period following the subscriber status being classified,
        wherein the intermediate firewall is configured to redirect DNS requests from a subscriber device associated with the subscriber to a suspension web-service,
        wherein the suspension web-service provides whitelisted webpages in a different IP domain in response to the DNS requests from the subscriber device, the whitelisted webpages including interactable resources that trigger a process for changing the subscriber status of the subscriber; and
    after the first time period, limiting, by the subscriber-management subsystem, usage by the subscriber of at least one additional network service of the network services provided by the network provider, wherein limiting usage by the subscriber of at least one additional service comprises allowing mobile-terminated calls to the subscriber device via the wireless telecommunication network while restricting mobile-originated calls from the subscriber device via the wireless telecommunication network.

8. The method of claim 7, further comprising:

after the first time period, further configuring the intermediate firewall to refuse to resolve subsequent DNS requests received from the subscriber device.

9. The method of claim 7, wherein the intermediate firewall is configured with subscriber information that enables the intermediate firewall to identify each of a plurality of subscriber devices associated with the subscriber and to partially limit access by each of the plurality of subscriber devices associated with the subscriber.

10. The method of claim 7, wherein usage of the at least one additional network service is limited in response to a determination that the subscriber fails to satisfy the service requirement after the first time period.

11. The method of claim 7, wherein the whitelisted webpages includes a particular webpage that enables a user to redefine the service requirement that the subscriber fails to satisfy.

12. The method of claim 7, wherein restricting the mobile-originated calls from the subscriber device includes:

blocking the mobile-originated calls from the subscriber device via the wireless telecommunication network.

13. The method of claim 7, wherein restricting the mobile-originated calls from the subscriber device includes:

redirecting the mobile-originated calls from the subscriber device to a support platform associated with the wireless telecommunication network.

14. A system comprising:

at least one hardware processor; and at least one non-transitory memory storing instructions that, when executed by the at least one hardware processor, cause the system to:

classify a subscriber status of a subscriber associated with a wireless telecommunication network based on the subscriber failing to satisfy a service condition related to network services provided by a network provider of the wireless telecommunication network, wherein the network services provided by the network provider include at least an Internet Protocol (IP) network connectivity service and one or more telecommunication services;

configure an intermediate firewall to partially limit usage by the subscriber of the IP network connectivity service for a first time period following the subscriber status being classified, wherein the intermediate firewall partially limits usage of the IP network connectivity service based on redirecting webpage requests from a subscriber device associated with the subscriber to a quarantine IP domain that includes whitelisted webpages that indicate the service condition that the subscriber fails to satisfy; and after the first time period, limit usage by the subscriber of at least one additional network service of the network services provided by the network provider, wherein limiting usage by the subscriber of at least one additional service comprises allowing mobile-terminated calls to the subscriber device via the wireless telecommunication network while restricting mobile-originated calls from the subscriber device via the wireless telecommunication network.

15. The system of claim 14, wherein the quarantine IP domain includes a set of whitelisted webpages dynamically generated with subscriber-specific information related to the service condition in response to the subscriber status being classified.

16. The system of claim 14, wherein the quarantine IP domain includes a whitelisted webpage that includes an interactable resource that triggers a process that results in the subscriber satisfying the service condition.

17. The system of claim 14, wherein the quarantine IP domain includes a whitelisted webpage that includes an interactable resource that enables a user of the subscriber device to redefine the service condition that the subscriber fails to satisfy.

18. The system of claim 14, wherein the intermediate firewall is configured to partially limit usage by the subscriber via each of a plurality of subscriber devices associated with the subscriber.

19. The system of claim 14, wherein restricting the mobile-originated calls from the subscriber device includes:

blocking the mobile-originated calls from the subscriber device via the wireless telecommunication network.

20. The system of claim 14, wherein restricting the mobile-originated calls from the subscriber device includes:

redirecting the mobile-originated calls from the subscriber device to a support platform associated with the network provider.

\* \* \* \* \*